United States Patent [19]

Micheli et al.

[11] Patent Number: 5,449,568
[45] Date of Patent: Sep. 12, 1995

[54] INDIRECT-FIRED GAS TURBINE BOTTOMED WITH FUEL CELL

[75] Inventors: Paul L. Micheli; Mark C. Williams; Edward L. Parsons, all of Morgantown, W. Va.

[73] Assignee: The United States of America as represented by the United States Department of Energy, Washington, D.C.

[21] Appl. No.: 141,978

[22] Filed: Oct. 28, 1993

[51] Int. Cl.⁶ ............................................. H01M 8/04
[52] U.S. Cl. ......................................... 429/20; 429/26
[58] Field of Search ............................ 429/17, 20, 26

[56] References Cited

U.S. PATENT DOCUMENTS

| | | |
|---|---|---|
| 3,976,507 | 8/1976 | Bloomfield ........................ 429/17 |
| 4,738,903 | 4/1988 | Garow et al. ..................... 429/20 X |
| 4,828,940 | 5/1989 | Cohen et al. ..................... 429/20 |
| 4,865,926 | 9/1989 | Levy et al. ...................... 429/20 |
| 4,921,765 | 5/1990 | Gmeindl .......................... 429/16 |
| 5,198,311 | 3/1993 | Nakazawa et al. ................. 429/20 |
| 5,319,925 | 6/1994 | Hendriks et al. ................. 429/17 X |

FOREIGN PATENT DOCUMENTS 62-080968  4/1987  Japan.
63-216270  9/1988  Japan.

Primary Examiner—Stephen Kalafut
Attorney, Agent, or Firm—David E. Breeden; Stephen D. Hamel; William R. Moser

[57] ABSTRACT

An indirect-heated gas turbine cycle is bottomed with a fuel cell cycle with the heated air discharged from the gas turbine being directly utilized at the cathode of the fuel cell for the electricity-producing electrochemical reaction occurring within the fuel cell. The hot cathode recycle gases provide a substantial portion of the heat required for the indirect heating of the compressed air used in the gas turbine cycle. A separate combustor provides the balance of the heat needed for the indirect heating of the compressed air used in the gas turbine cycle. Hot gases from the fuel cell are used in the combustor to reduce both the fuel requirements of the combustor and the NOx emissions therefrom. Residual heat remaining in the air-heating gases after completing the heating thereof is used in a steam turbine cycle or in an absorption refrigeration cycle. Some of the hot gases from the cathode can be diverted from the air-heating function and used in the absorption refrigeration cycle or in the steam cycle for steam generating purposes.

11 Claims, 1 Drawing Sheet

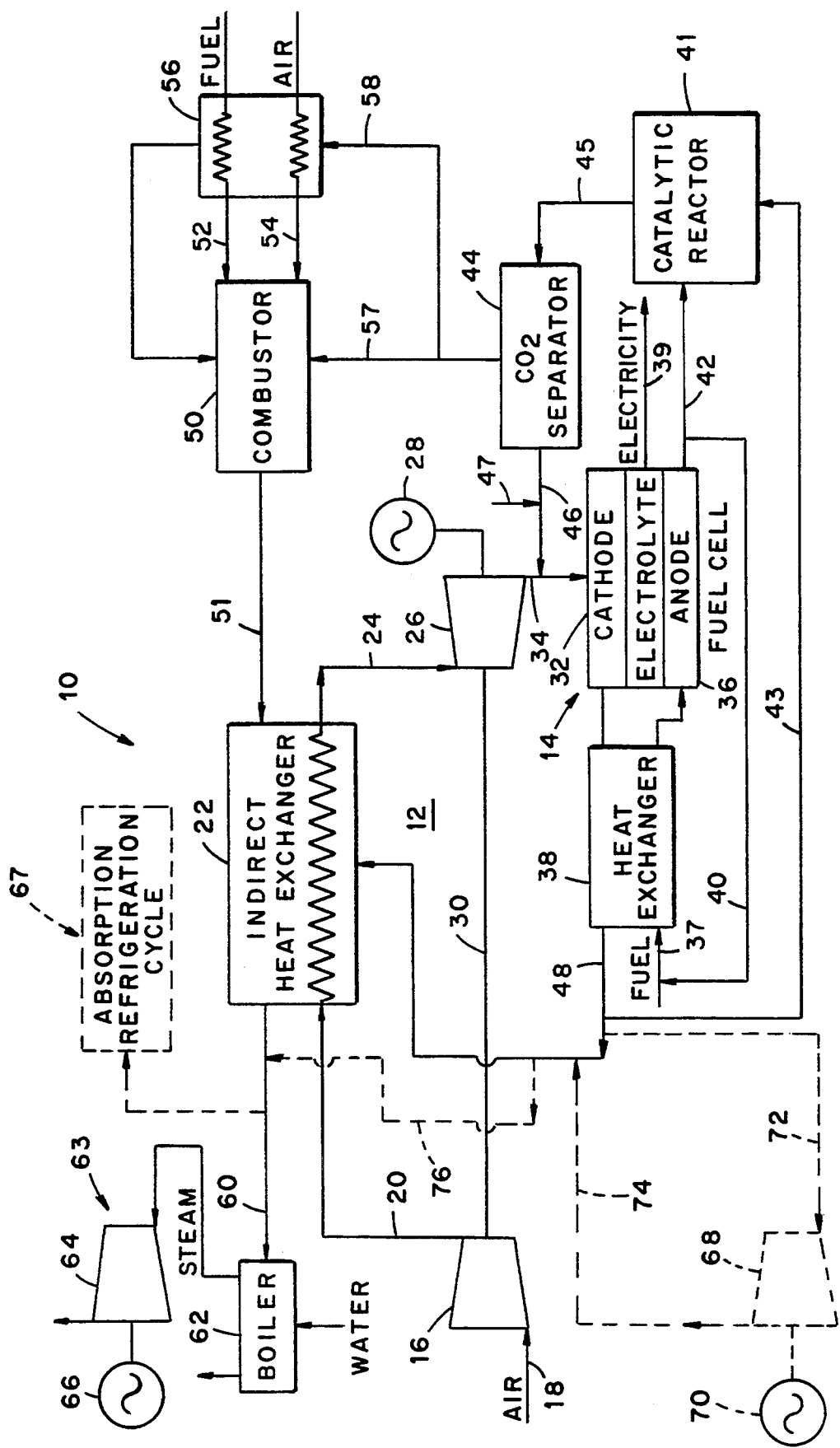

INDIRECT-FIRED GAS TURBINE BOTTOMED WITH FUEL CELL

BACKGROUND OF THE INVENTION

The present invention relates generally to an indirect-fired gas turbine cycle combined with a fuel-cell cycle, and more importantly to such a combination of cycles wherein the fuel cell cycle bottoms the indirect-fired gas turbine cycle. This invention was made with the support of the United States Government under contract No. DE-AC05-84OR21400 awarded by the U.S. Department of Energy. The United States Government has certain rights in this invention.

Gas turbines and fuel cells are well known mechanisms used for the production of electric power. Gas turbine cycles and fuel-cell cycles have each been previously bottomed with steam turbine cycles for the co-generation of electric power. With cycles lo employing a fuel cell, such as a molten carbonate fuel cell and bottomed with a steam cycle, compressors are normally used to provide a stream of pressurized air to the cathode of the fuel cell. To enhance fuel cell performance carbon dioxide is added to the air stream with the resulting mixture undergoing an electrochemical reaction with fuel introduced at the anode of the fuel cell. The fuel cell produces electrical energy and provides streams of hot gases used for generating steam for a bottoming steam turbine cycle that is coupled to a suitable electrical generator.

A variation of such a combined fuel cell and steam turbine arrangement uses a fuel cell bottomed with a gas turbine instead of the steam turbine cycle so that residual heat energy in the cathode exhaust stream can be directly extracted in the gas turbine for the production of electrical power. Such a system is described in assignees U.S. Pat. No. 4,921,765 to Gmeindl et. al. which issued May 1, 1990 and is incorporated herein by reference.

In another variation of gas turbine cycles and fuel cell cycles, a direct-fired gas turbine cycle is combined with a fuel cell cycle for producing the hot gas stream used for driving the gas turbine and thereby providing generation of electrical power in both the gas turbine cycle and the fuel cell cycle.

While these previously known combined cycles using a fuel cell cycle bottomed with a gas turbine or a direct-fired gas turbine cycle combined with a fuel cell cycle for producing the turbine driving gases do provide for the co-generation of electrical power, these so-combined cycles have not been found to be particularly capable of promoting power conversion at high efficiencies. The primary reason for this short-coming is presently available fuel cells, such as molten carbonate fuel cells as described in assignees aforementioned patent, can only operate at pressures up to about six atmospheres so as to provide turbine-driving gas streams at pressures less than required for efficient operation of the gas turbine.

SUMMARY OF THE INVENTION

Accordingly, it is a principal aim or objective of the present invention to provide an indirect-fired gas-turbine cycle bottomed with a fuel-cell cycle whereby the gas turbine can be operated at optimum pressures for efficient power conversion. In this combined cycle arrangement the gas turbine is driven with indirectly heated air at a pressure appropriate for efficient operation of the gas turbine while the hot air exhausted from gas turbine, which is at a pressure considerably less than that at the gas turbine inlet, is directly utilized in the fuel cell cycle for the electrochemical reaction. In the present invention the temperature and pressure of the hot air exhausting from the gas turbine can be readily tailored to essentially match the temperature and pressure required for efficient operation of the fuel cell cycle.

Generally, the indirect-fired gas turbine system or cycle bottomed with a fuel cell cycle of the present invention comprises: compressor means for providing a stream of compressed air; indirect heat exchange means connected to the compressor means for receiving the stream of compressed air; means for supplying the heat exchange means with a stream of heated gases for indirectly heating the stream of compressed air; gas turbine means connected to the heat exchange means for receiving the heated stream of compressed air for driving the gas turbine means; fuel cell means having anode means and cathode means connected to the gas turbine means for receiving the stream of heated air discharged therefrom at the cathode means; means coupled to the anode means for supplying fuel thereto for effecting in the fuel cell means an electrochemical reaction with the stream of heated air for producing an electrical output while generating a stream of heated gases at the anode means and a stream of heated gases at the cathode means; and, conduit means coupling the cathode means to the heat exchange means for providing at least a portion of the stream of heated gases supplied to the heat exchange means for indirectly heating the stream of compressed air.

In a preferred embodiment of the present invention combustion chamber means are connected to fuel cell for receiving the stream of heated gases therefrom with this stream of heated gases being primarily provided by the anode means. Fuel and air are supplied to the combustion chamber means from external sources for producing a stream of combustion products including the stream of heated gases from the anode means. The combustion chamber means are connected to the heat exchange means whereby the stream of combustion products provides the balance of the stream of heated gases supplied to the heat exchange means for indirectly heating the stream of compressed air to the desired turbine inlet temperature.

A portion of the hot gas stream from the cathode means can be combined in a suitable catalytic reactor with the stream of hot gases including residual fuel values from the anode means for the production of carbon dioxide. The carbon dioxide in the discharge stream of hot gases from the catalytic reactor is separated from these gases in a suitable separator and mixed with the hot air stream discharged from the gas turbine for use in the fuel cell.

In a modification of the preferred embodiment of the present invention cell further gas turbine means can be provided for receiving the stream of heated gases from the cathode means before these gases are introduced into the heat exchange means used for the indirect heating of the compressed air stream.

The streams of heated gases that are discharged from the heat exchange means are preferably utilized for the generation of steam used in a steam turbine cycle but can be used for other heat requiring purposes such as in a refrigeration system utilizing an absorption chiller. If desired, a portion of the stream of heated gases discharged from the cathode means of the fuel cell means can be bypassed around the heat exchange means for facilitating the generation of the steam used in the steam turbine cycle or for increasing the temperature of the gases used in the absorption chiller.

By bottoming the fuel cell means with a steam turbine cycle residual heat energy can be extracted from the gases discharged from the heat exchanger in the indirect-fired gas turbine cycle resulting in a combined system that is expected to provide an overall cycle efficiency of about 59% which represents a significant improvement over the estimated efficiency of about 55% for previously known combined systems in which a relatively low efficiency steam cycle bottoms a fuel cell or a direct-fired gas turbine.

Also, by using the hot exhaust gases from the fuel cell as provided from the cathode for heating the compressed air in the heat exchanger of the gas turbine cycle, about 35-40% of the heat required to raise the compressed air at the inlet to a suitable gas turbine operating temperature in the range of about 1600° to 2600° F., preferably about 2300° F. can be provided. This arrangement considerably reduces the fuel requirement for heating the compressor discharge air to the desired gas turbine inlet temperature.

By employing the exhaust gases from the fuel cell anode in the combustor, the normal tendency of the combustor to provide relatively high NOx production is substantially reduced. With the anode exhaust gases being formed of essentially noncombustible reaction gases a low NOx stream is provided at a useful temperature for mixing with the combustion gases produced in the combustor so as to substantially reduce the production of NOx in the combustor as well as contributing to the volume of combustion products discharged from the combustor into the heat exchanger of the gasturbine system.

Many hardware limitations are overcome by using an indirect-fired gas turbine cycle bottomed with a fuel cell cycle as compared to a fuel cell cycle bottomed with a steam turbine cycle. For example, with the indirect-fired gas turbine cycle bottomed with the fuel cell cycle the gas turbine provides flexibility for moving available heat into the more efficient Brayton cycle and a separate heat exchanger in not required for heating the air used in the fuel cell.

Other and further objects of the present invention will become obvious upon an understanding of the illustrative embodiment and modifications thereof about to be described or will be indicated in the appended claims, and various advantages not referred to herein will occur to one skilled in the art upon employment of the invention in practice.

DESCRIPTION OF THE DRAWINGS

The figure is a schematic diagram illustrating details of the combined indirect-fired gas turbine cycle bottomed with a fuel cell cycle of the present invention.

A preferred embodiment of the invention and modifications thereof have been chosen for the purpose of illustration and description. The preferred embodiment and the modifications illustrated in the single figure are not intended to be exhaustive nor to limit the invention to the precise forms shown. The preferred embodiment and illustrative embodiments are chosen and described in order to best explain the principles of the invention and their application and practical use to thereby enable others skilled in the art to best utilize the invention in various embodiments and modifications as are best adapted to the particular use contemplated.

DETAILED DESCRIPTION OF THE INVENTION

The fuel cell used in the combined indirect-fired gas turbine cycle and fuel-cell cycle of the present invention in the description below is described as being a molten carbonate fuel cell, since molten carbonate fuel cells have been adequately developed for use in the combined cycle arrangement of the present invention. Generally, a molten carbonate fuel cell has an anode of porous nickel or the like separated from a cathode of porous nickel oxide or the like by an electrolyte formed of an alkali metal carbonate and mixtures thereof with a suitable material such as $LiAlO_2$. With the electrolyte heated to a molten state a fuel such as hydrogen, fuel gas or natural gas admitted at the anode undergoes an electricity-producing electrochemical reaction with oxygen and carbon dioxide admitted at the cathode. This electrochemical reaction also produces hot streams of reaction gases at the anode and at the cathode. A detailed description of molten carbonate fuel cells is set forth in assignees aforementioned patent. While the fuel cell cycle employed in the present invention is preferably a molten carbonate fuel cell, it will appear clear that other types of fuel cells such as a conventional solid oxide fuel cell may be readily employed.

As briefly described above, the present invention is directed to an indirect-fired gas turbine cycle bottomed with a fuel-cell cycle for providing a combined cycle arrangement wherein the gas turbine exhaust is advantageously provided at a fuel cell operating temperature in the range of about 1000° to 2000° F., preferably about 1050° F. for molten carbonate fuel cells and about 1800° F. for solid oxide fuel cells. This exhaust stream from the gas turbine can be directly utilized in the cathode of a fuel cell for undergoing an electrochemical reaction with a suitable fuel introduced at the anode of the fuel cell. The fuel cell, in turn, produces electrical energy and a stream of hot exhaust gases at the anode and the cathode with the hot cathode or cathode recycle stream, which is at a temperature in the range of about 1000° to 2000° F., being used in the heat exchanger of the gas turbine cycle for providing a significant percentage of the total heat required for indirectly heating the compressed air stream to the desired gas turbine inlet temperature. The hot-fuel exhaust stream of the anode is advantageously used in a fuelair combustor for reducing the fuel requirements of the combustor for producing a stream of hot combustion products to the temperature required for indirectly heating the compressed air stream to the desired turbine inlet temperature. The mixing of the anode gases with the combustion products produced in the combustor also considerably reduces the NOx emissions in the hot gas stream discharged from the combustor.

The stream of gases exhausted stream from the gas turbine heat exchanger has sufficient residual heat energy for the production of steam, especially when combined with a portion of the hot cathode recycle stream, for use in a steam turbine cycle.

As described more specifically and with reference to the accompanying figure, the combined cycle arrangement of the present invention as shown at 10 comprises an indirect-fired gas turbine cycle 12 and a fuel cell cycle including a fuel cell 14 bottoming the gas turbine cycle 12. The fuel cell 14 is a molten carbonate fuel cell of the type described in assignee's aforementioned patent. However, as pointed out above it is to be understood that this fuel cell can be another type of fuel cell such as a solid oxide fuel cell since it is expected that the cycle efficiencies obtained by using a solid oxide fuel cell in the combined cycle of the present invention will provide a system efficiency substantially similar to that provided by utilizing a molten carbonate fuel cell.

The indirect-fired gas turbine cycle 12 is provided by a compressor 16 of any suitable type capable of receiving stream of air 18 at the inlet thereof and compressing this stream of air to a pressure in the range of about 5 to 30 atmospheres and to a temperature in the range of about 300° to 800° F. This stream of compressed air is passed through conduit 20 into a heat exchanger 22 where the compressed air stream is indirectly heated by combined hot gas streams as will be described below to a suitable gas turbine inlet temperature in the range of about 1600° to 2600° F., preferably about 2300° F. The heat exchanger 22 may be of any suitable type capable of heating the compressed air to the desired temperature range. Preferably, the heat exchanger 22 is formed of high temperature metal and/or a ceramic material due to the relatively high temperature requirements of the gas turbine cycle. The hot compressed air stream discharged from the heat exchanger 22 is conveyed through conduit 24 to a gas turbine 26 for driving the latter. As shown, the gas turbine 26 is coupled to an electrical generator 28 and to the compressor 16 through a drive shaft 30. However, it will be clear that the compressor 16 can be driven by a power source independent of the gas turbine 26.

The cathode 32 of the fuel cell 14 is coupled to the outlet of the gas turbine 26 by conduit 34 for directly receiving at the cathode 32 the hot air stream exhausted from the gas turbine 26. This turbine exhaust is at a temperature in the range of about 600° to 1300° F., preferably 1050° F., which is sufficient to effect the desired electrochemical reaction in the fuel cell. This temperature of the turbine exhaust can be readily tailored to any selected temperature in this range by controlling the amount of heating of the compressed air stream taking place in the heat exchanger 22. Since molten carbonate fuel cells can operate at a pressure in the range of about atmospheric to about six atmospheres. The hot air exhaust from the gas turbine 26 is preferably at a pressure which can be advantageously utilized in the operation of the fuel cell cycle. The pressure of the gas turbine exhaust stream can be readily controlled within the aforementioned range by selecting the compressor output pressure and volume and/or by controlling the pressure drop across the gas turbine. The higher pressures in this range for the turbine exhaust may be advantageous if it is desired to use the cathode recycle stream for driving a low pressure gas turbine in the cathode recycle stream as will be described below.

As the heated air from the turbine exhaust enters the cathode 32 of the fuel cell 14, a gaseous fuel such as or natural gas is concurrently conveyed into the anode 36 of the fuel cell 14 via conduit 37. This gaseous fuel is preferably preheated to a temperature generally corresponding to that of the air stream delivered to the cathode 32 so as to assure the liquification of the carbonate electrolyte and thereafter facilitating the continuing electrochemical reaction within the fuel cell 14. Such preheating of this fuel can be readily achieved by employing a simple heat exchanger 38 with the heat thereto being conveniently provided to this heat exchanger by the cathode exhaust stream. With the heated streams of fuel and air delivered to the fuel cell 14, the electrochemical reaction proceeds as described in assignee's aforementioned patent to generate electrical energy such as generally shown at 39 while producing reaction gases formed primarily of carbon dioxide ($CO_2$) and steam at the anode 36 and recycled $CO_2$, water and air at the cathode 32. As shown, a portion of the anode exhaust stream is recycled to the anode fuel inlet via conduit 40 so as to extract residual fuel from the anode exhaust stream.

While the electrochemical reaction in the fuel cell 14 can be initiated and sustained by using the normal concentrations of $CO_2$ in air fuel cell operations at higher efficiencies can be provided by mixing $CO_2$ with the turbine exhaust stream or with the air at the inlet to the compressor 16 and thereby assuring that an adequate concentration of $CO_2$ is at the cathode 32 for efficiently effecting the electrochemical reaction. This stream of $CO_2$ can be provided from any suitable source. For example, a residual fuel converter such as a catalytic reactor shown at 41 can be used to produce $CO_2$ by reacting gaseous reactants in the anode and cathode gas streams including residual fuel values in the anode exhaust stream in the presence of a suitable catalyst such as a platinum-nickel catalyst. For this purpose gases exhausted from the anode 36 are passed through a conduit 42 into the catalytic reactor 41 where they are mixed with a portion of the recycle gases from the cathode 32 that are conveyed to the reactor 41 through conduit 43. The hot gases resulting from the catalytic reaction including the $CO_2$ are discharged from the reactor 41 and conveyed into a $CO_2$ separator 44 through conduit 45 for the separation of the $C_O2$ from the stream of reaction gases. This separation of the $CO_2$ from the stream of reaction gases can be achieved in any suitable manner such as by using a ceramic membrane selectively permeable to $CO_2$. The stream of $CO_2$ separated from the reactor exhaust stream can be mixed with the cathode air stream by connecting the $CO_2$ separator to the conduit 34 with conduit 46. If additional $CO_2$ is required for the electrochemical reaction during fuel cell start-up or during the operation of the fuel cell, selected amounts of $CO_2$ from any suitable source (not shown) can be added to the cathode air supply via line 47 shown coupled to line 46.

As shown in the figure, the anode and cathode exhaust gases, which are at a temperature in the range of about 1000° to 1300° F., usually about 150°-200° F. higher than the temperature of the air and fuel delivered to the fuel cell 14, are discharged from the fuel cell 14 via conduit 42 at the anode 36 and conduit 48 at the cathode 32. The cathode discharge conduit 48 is coupled to the heat exchanger 22 so that this high temperature waste gas or cathode recycle gas provided at the cathode 32, except for the portion thereof used in the catalytic reactor 41 with the anode exhaust stream for the production of $CO_2$, can be advantageously utilized in a heat exchanger 22 for supplying a substantial percentage of the heat requirements needed for the indirect heating of the compressed air stream to a temperature in the range of about 1600°-2600° F. For example, with a preferred temperature of about 2300° F. for the compressed air at the turbine inlet, the cathode exhaust stream can provide about 35-40% of the heat needed for heating the compressed air stream to this temperature.

The balance of the heat requirements of the heat exchanger 22 for indirectly heating the compressed air stream to the selected turbine inlet temperature is provided by a stream of hot combustion products generated in a combustion chamber or combustor 50 and conveyed to the heat exchanger 22 via conduit 51. A suitable fuel such as biomass, coal, peat, fuel gas, natural gas, or the like from a suitable source (not shown) is conveyed into the combustor 50 through conduit 52 where the fuel is burned in the presence of air delivered from a suitable source (not shown) into the combustor 50 through a conduit 54. The fuel and air in lines 52 and 54 are preferably preheated prior to being introduced into the combustor 50 to promote the exothermic combustion reaction occurring in the combustor 50. This preheating of the fuel and air can be readily achieved in an indirect heat exchanger 56 encompassing selected lengths of the fuel and air lines 52 and 54 by passing a portion of the hot gases from the $CO_2$ separator 44 that are being conveyed through line 57 coupled between the $CO_2$ separator 44 into a conduit 58 coupled to the heat exchanger 56. If desired this heating of the fuel and air used in the combustor 50 may be augmented or entirely provided by passing a portion of the gas turbine exhaust gases through the heat exchanger 56 prior to being introduced into the cathode 32.

In accordance with the present invention the fuel requirements of the combustor 50 for providing a stream of gaseous products of combustion at a sufficient temperature of about 2000°–2800° F., preferably about 2600° F, for indirectly heating the compressed air to a temperature in the range of about 1600°–2600° F., preferably about 2300° F., in the heat exchanger 22 are substantially reduced by using the cathode exhaust stream in the heat exchanger 22. These fuel requirements are even further reduced by utilizing the hot stream of fuel cell waste gases conveyed into the combustor 50 through conduit 57 for adding heat to the combustion gases and increasing the volume of heated gases produced in the combustor 50 as well as significantly reducing the volume of NOx present in the gas stream discharged from the combustor 50. Also, the fuel cell exhaust gases in line 58 that are used to preheat the fuel and air in the heat exchanger 56 can be conveyed into the combustor 50 to further reduce the volume of NOx. Alternatively, the stream of gases exiting the heat exchanger 56 can be discharged into the atmosphere.

After utilizing the streams of hot gases provided by the cathode 32 and by the combustor 50 in the heat exchanger 22 for heating compressed air stream, these gases when discharged from the heat exchanger 22 can be discharged to the atmosphere or partially recycled to the combustor. However these exhaust gases are preferably passed through line 60 into a boiler or the like 62 of a steam turbine cycle 63 for extracting residual heat energy from these gases while producing steam for use in a steam turbine 64 for the generation of electrical power by a generator 66.

In a modification of the present invention, the gases exhausted from the heat exchanger 22 are used as a source of heat in a refrigeration system 67 using an absorption chiller.

By employing the indirect-heated gas turbine cycle 12 in combination with the fuel cell cycle and the steam turbine cycle 63, as described above, the resulting three electrical power generating sources provide an increase in the overall cycle efficiency of about 6% over a fuel-cell cycle bottomed by a steam-turbine cycle or by a direct-heated gas turbine cycle employing a fuel cell cycle.

In another modification of the present invention and with the fuel cell 14 operating at a pressure greater than atmospheric such as in the order of about two to five atmospheres, the cathode exhaust stream will be at a pressure adequate to drive a low-pressure turbine under pressurized conditions. As shown in the figure, a low-pressure turbine 68 with an electrical generator 70 is connected by conduit 72 to the cathode discharge line 48 for receiving a portion or all of the cathode exhaust stream. The exhaust gases from turbine 68 are preferably returned to conduit 48 via conduit 74 for air heating purposes in the heat exchanger 22 as described above. Of course, by using such a low-pressure gas turbine the temperature of the cathode exhaust stream will be reduced to a temperature less than that provided at the cathode discharge so as to require that the combustor 50 provide a greater percentage of the heat requirements of the heat exchanger 22.

The temperature of the exhaust gases from the heat exchanger 22 of the gas turbine cycle 12 tends to be below about 1,000° F., thus making for a low quality and lower efficiency steam bottoming cycle. However, the diverting of a portion of the fuel cell exhaust which is at about 1300°–1500° F. to this heat exchanger exhaust stream can significantly increase the performance of the steam cycle. This modification of the present invention is shown in the figure, where a portion of the hot cathode exhaust gases are be bypassed around the heat exchanger 22 via conduit 76 and then combined with the gases discharged from the heat exchanger 22 for use in the boiler 62. By so bypassing a portion of hot cathode gases around the heat exchanger, the efficient generation of steam in the boiler 62 can be effected without requiring the combustor to provide gases at a temperature higher than that which can be advantageously utilized in the heat exchanger 22.

It will be seen that the indirect-fired gas turbine cycle bottomed with the fuel cell cycle and further employing a steam turbine cycle together provide a significant improvement in combined cycle technology which operates at a relatively high efficiency as compared to previously known combined cycles such as described above. Also, by bottoming the indirect-fired gas turbine cycle with a fuel cell cycle the latter is provided with a source of air at the cathode at the desired volume and pressure and preheated to the temperature desired for the electrochemical reaction occurring within the fuel cell so as to obviate the use of separate air compressors and air heaters as previously required for fuel cell operation.

What is claimed is:

1. An indirect-fired gas turbine cycle bottomed with a fuel cell cycle, comprising in combination compressor means for providing a stream of compressed air, indirect heat exchange means for receiving the stream of compressed air from the compressor means, means for supplying the heat exchange means with a stream of heated gases for indirectly heating the stream of compressed air, gas turbine means for receiving the heated stream of the heated compressed air, fuel cell means having anode means and cathode means, conduit means connecting the gas turbine means to the cathode means for conveying thereinto a stream of heated air discharged from the gas turbine means, fuel supply means coupled to the anode means for supplying fuel thereinto, said fuel at the anode means and said stream of heated air at the cathode means undergoing an electrochemical reaction within the fuel cell means for producing an electrical output while generating a stream of heated gases at the anode means and a stream of heated gases at the cathode means, and conduit means coupling the cathode means to the heat exchange means for conveying the stream of heated gases into the heat exchange means to provide at least a portion of the stream of heated gases supplied to the heat exchange means for indirectly heating the stream of compressed air.

2. An indirect-fired gas turbine cycle bottomed with a fuel cell cycle as claimed in claim 1, wherein the fuel cell means is a molten carbonate cell or a solid oxide fuel cell.

3. An indirect-fired gas turbine cycle bottomed with a fuel cell cycle as claimed in claim 1, wherein further gas turbine means are adapted to receive at least a portion of the stream of heated gases from the cathode means before the introduction thereof into said heat exchange means.

4. An indirect-fired gas turbine cycle bottomed with a fuel cell cycle as claimed in claim 1, wherein combustion chamber means are connected to at least one of said anode means and said cathode means for receiving the heated gases therefrom, wherein means are provided for conveying fuel and air into the combustion chamber means for producing a stream of combustion products including the heated gases from said at least one of the anode means and the cathode means, and wherein the combustion chamber means are connected to said heat exchange means for conveying thereinto the balance of the stream of heated gases supplied to the heat exchange means for indirectly heating the stream of compressed air.

5. An indirect-fired gas turbine cycle bottomed with a fuel cell cycle as claimed in claim 4, wherein the fuel cell means is a molten carbonate fuel cell, wherein the heated gases from said anode means includes residual fuel values, wherein $CO_2$-producing catalytic reactor means are coupled to the anode means for receiving the heated gases therefrom, wherein the conduit means coupling the cathode means to the heat exchange means are coupled to said reactor means for conveying a portion of heated gases from the cathode means into said reactor means, wherein carbon dioxide separating means are coupled to said reactor means for receiving and separating carbon dioxide from a stream of heated gases discharged therefrom, and wherein the gas separating means are connected to the conduit means connecting the gas turbine means to the fuel cell means for introducing the stream of carbon dioxide into the stream of heated air being conveyed into the cathode means.

6. An indirect-fired gas turbine cycle bottomed with a fuel cell cycle as claimed in claim 4, including a steam turbine cycle comprising steam generating means and steam turbine means, wherein conduits means connect the steam generating means to the heat exchange means for receiving therefrom a stream of heated gases discharged from the heat exchange means after heating the stream of compressed air, and wherein the steam turbine means are coupled to said steam generating means for receiving a stream of steam therefrom.

7. An indirect-fired gas turbine cycle bottomed with a fuel cell cycle as claimed in claim 6, wherein conduit means connect the cathode means to the steam generating means for diverting from the heat exchange means a portion of the stream of heated gases from the cathode means and mixing the diverted portion with the stream of heated gases discharged from the heat exchange means.

8. An indirect-fired gas turbine cycle bottomed with a fuel cell cycle as claimed in claim 4, wherein further heat exchange means are coupled to said means for conveying the fuel and air into the combustion chamber means, and wherein conduit means are coupled to said fuel cell means for conveying at least a portion of the heated gases from the fuel cell means through said further heat exchange means for heating the fuel and air conveyed into the combustion chamber means.

9. An indirect-fired gas turbine cycle bottomed with a fuel cell cycle as claimed in claim 4, wherein refrigeration means having an absorption chiller are coupled to said heat exchange means for receiving therefrom a stream of gases containing residual heat values.

10. An indirect-fired gas turbine cycle bottomed with a fuel cell cycle as claimed in claim 4, wherein said heat exchange means is a heat exchanger comprising at least one of a metal and a ceramic material.

11. An indirect-fired gas turbine cycle bottomed with a fuel cell cycle as claimed in claim 4, wherein the stream of compressed air is indirectly heated in said heat exchange means to a temperature in the range of about 1600°–2600° F., wherein the stream of heated air discharged from the gas turbine means is at a temperature in the range of about 600°–1300° F., wherein the stream of heated gases at the cathode means is at a temperature in the range of about 1000°–2000° F., and wherein the stream of combustion products is at a temperature in the range of about 2000°–2800° F.

* * * * *